UNITED STATES PATENT OFFICE.

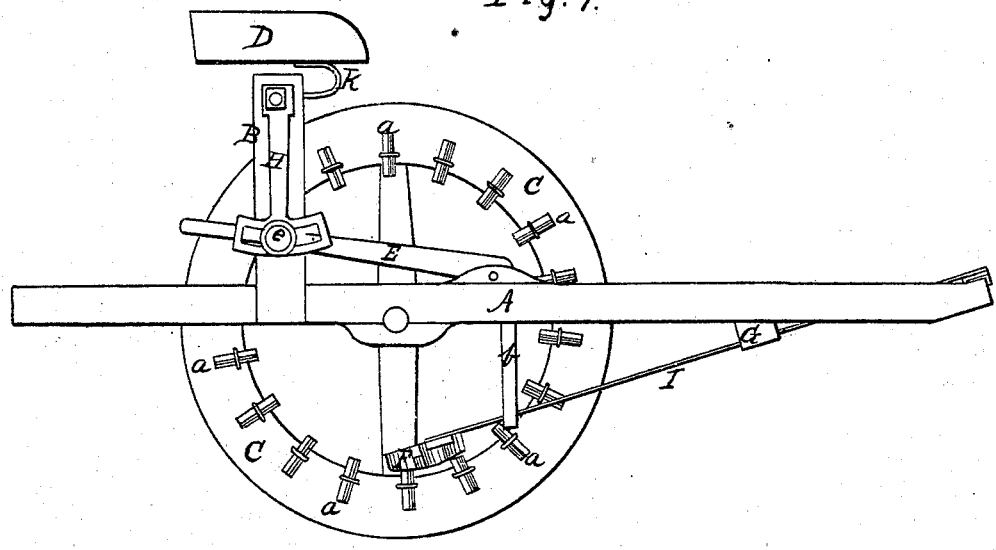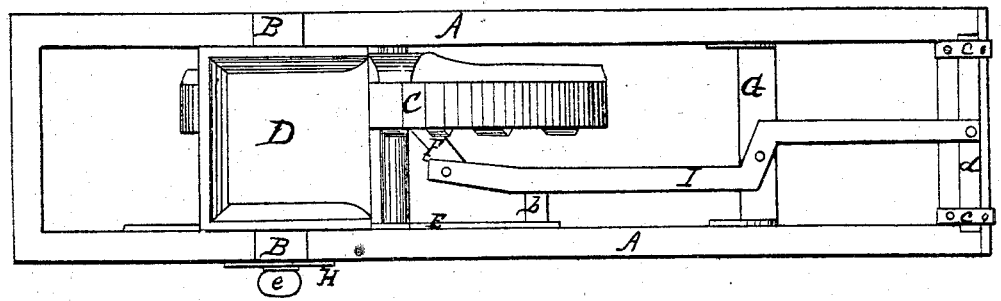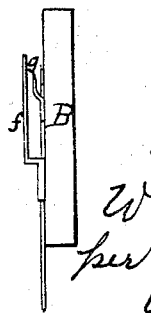

MOSES H. RIPLEY AND WILLIAM N. TEMPLE, OF MINNEAPOLIS, MINN.

IMPROVEMENT IN HARVESTERS.

Specification forming part of Letters Patent No. 88,511, dated March 30, 1869; antedated March 25, 1869.

*To all whom it may concern:*

Be it known that we, MOSES H. RIPLEY and WILLIAM N. TEMPLE, of Minneapolis, in the county of Hennepin, and in the State of Minnesota, have invented certain new and useful Improvements in Reapers and Mowers; and do hereby declare that the following is a full, clear, and exact description thereof, reference being had to the accompanying drawings, and to the letters of reference marked thereon.

The nature of our invention consists in the manner of operating the sickle and of throwing the same in and out of gear; also, in a movable seat attached to the machine.

In order to enable others skilled in the art to make and use our invention, we will now proceed to describe its construction and operation, referring to the annexed drawings, which form a part of this specification, and in which—

Figure 1 is a side view, and Fig. 2 is a plan view. Fig. 3 is a rear view of the adjusting arrangement for the sickle.

A represents a carriage-frame of suitable material and dimensions, in which the axle of the wheel C has its bearings. This wheel is provided on one side with a series of square pointed lugs, $a$ $a$, which project beyond the inside periphery of the same. These lugs are fastened to the side of the wheel in any manner suitable.

In front of the wheel, in a frame, is a cross-bar, G, on which a bent lever, I, is pivoted in such a manner that its rear end extends downward toward the inner periphery of the lower side of said wheel. In this end the lever is provided with a block, F, which is cut or grooved on its lower side in such a manner that when the wheel C revolves the lugs $a$ $a$ strike it first on one side, then on the other, giving the front end of the lever I a vibrating motion. The said front end of the lever I is provided with a metal cross-bar, $d$, which runs or moves in two loops, $c$ $c$, on the front part of the frame A, and to which the cutting-bar may be attached in any manner desired.

The block F may be raised, and thus thrown out of gear with the lugs $a$ $a$, by means of a lever, E, which is pivoted on the inside of the frame A, and has an arm, $b$, extending downward, embracing the lever I.

On the sides of the frame A, in rear of the axle, are two standards B B, on the inner side of one of which the said lever E is held, in such position as to throw the block F in and and out of gear, by means of angular bars or hooks $f$ and $g$, placed at suitable points to accomplish this object.

Between the upper ends of the standards B B is a shaft or beam, on which is a spring, K, supporting the seat D, and said seat is made adjustable by means of a lever, H, attached to one end of said shaft or beam, on the outside of the post B. This lever has a slotted cross-arm in its lower end, through which a screw, $e$, is passed into said post, thus holding the seat in any position desired.

Having thus fully described our invention, what we claim as new, and desire to secure by Letters Patent, is—

1. The arrangement of the seat D, spring K, slotted bar H, and screw $e$ with the standards, all as shown and described.

2. The arrangement of the lever E, block F, lever I, and wheel C with lugs $a$ $a$, all as herein shown and described.

In testimony that we claim the foregoing we have hereunto set our hands this 13th day of June, 1868.

MOSES H. RIPLEY.
      WM. N. TEMPLE.

Witnesses:
 CHAS. H. WOODS,
 GEORGE BRADLEY.